United States Patent
Joyce et al.

(10) Patent No.: US 10,412,891 B2
(45) Date of Patent: Sep. 17, 2019

(54) DRAPER BELT SYSTEM WITH DIFFERENTLY SIZED ROLLERS

(71) Applicant: CNH Industrial America LLC, New Holland, PA (US)

(72) Inventors: Joshua S. Joyce, Lititz, PA (US); Zachary Long, Harleysville, PA (US); James F. Rayfield, New Holland, PA (US); Andrew V. Lauwers, Sandusky, OH (US); Blaine R. Noll, Fleetwood, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/412,651

(22) Filed: Jan. 23, 2017

(65) Prior Publication Data
US 2018/0206406 A1    Jul. 26, 2018

(51) Int. Cl.
*A01D 61/00* (2006.01)
*A01D 61/02* (2006.01)

(52) U.S. Cl.
CPC ......... *A01D 61/006* (2013.01); *A01D 61/002* (2013.01); *A01D 61/02* (2013.01)

(58) Field of Classification Search
CPC ...... A01D 57/20; A01D 41/14; A01D 61/002; A01D 45/021; A01D 34/30; A01D 41/144; A01D 43/06; A01D 34/283; A01D 61/02
See application file for complete search history.

(56) References Cited

U.S. PATENT DOCUMENTS

| | | | |
|---|---|---|---|
| 1,689,185 A | 10/1928 | Shute | |
| 4,841,718 A * | 6/1989 | Sund | A01D 41/10 56/364 |
| 7,766,158 B2 | 8/2010 | Laganiere | |
| 7,788,891 B2 | 9/2010 | Puryk et al. | |
| 7,805,917 B2 | 10/2010 | Kempf et al. | |
| 8,065,865 B1 * | 11/2011 | Dow | A01D 57/20 56/181 |
| 9,078,396 B2 | 7/2015 | Yanke et al. | |
| 9,402,343 B1 * | 8/2016 | Allochis | A01D 34/283 |

(Continued)

FOREIGN PATENT DOCUMENTS

GB    1531187 A    11/1978

*Primary Examiner* — Arpad Fabian-Kovacs
(74) *Attorney, Agent, or Firm* — Peter K. Zacharias; Patrick M. Sheldrake (57) ABSTRACT

A draper belt system is provided that includes first and second draper belt assemblies. The first draper belt assembly includes first and second rollers, and a draper belt looped around the first and second rollers. The first roller defines a first roller diameter, a first central longitudinal axis, and a first plane extending through the first central longitudinal axis. The second draper belt assembly includes third and fourth rollers, and a draper belt looped around the third and fourth rollers. The third roller defines a third roller diameter dimensioned smaller than the first roller diameter, a second central longitudinal axis, and a second plane extending through the second central longitudinal axis. The third roller of the second draper belt assembly is disposed adjacent to the first roller with the first central longitudinal axis extending parallel to the second central longitudinal axis, and the second plane offset from the first plane.

17 Claims, 10 Drawing Sheets

(56) References Cited

U.S. PATENT DOCUMENTS

| | | | | |
|---|---|---|---|---|
| 9,622,409 | B2* | 4/2017 | Coers | A01D 41/14 |
| 2002/0129591 | A1* | 9/2002 | Patterson | A01D 57/20 56/158 |
| 2004/0148919 | A1* | 8/2004 | Dunn | A01D 41/14 56/16.4 R |
| 2007/0193243 | A1* | 8/2007 | Schmidt | A01D 41/14 56/181 |
| 2007/0251202 | A1* | 11/2007 | Coers | A01D 57/20 56/181 |
| 2008/0271426 | A1* | 11/2008 | Lohrentz | A01D 41/14 56/153 |
| 2008/0295473 | A1* | 12/2008 | Tippery | A01D 41/144 56/14.5 |
| 2009/0320431 | A1* | 12/2009 | Puryk | A01D 41/14 56/181 |
| 2011/0099964 | A1* | 5/2011 | Coers | A01D 34/30 56/296 |
| 2012/0042617 | A1* | 2/2012 | Dow | A01D 61/002 56/14.5 |
| 2013/0105282 | A1* | 5/2013 | Hoffman | A01D 41/14 198/814 |
| 2014/0075906 | A1* | 3/2014 | Heim | A01D 61/004 56/105 |
| 2014/0075907 | A1* | 3/2014 | Ritter | A01D 45/021 56/105 |
| 2014/0075909 | A1* | 3/2014 | Bomleny | A01D 41/144 56/119 |
| 2015/0059307 | A1* | 3/2015 | Ritter | A01D 75/182 56/6 |
| 2015/0195992 | A1* | 7/2015 | Corum | A01D 61/002 198/498 |

* cited by examiner

DRAPER BELT SYSTEM WITH DIFFERENTLY SIZED ROLLERS

BACKGROUND

Harvesters are used in the agricultural industry to harvest a variety of crops. Headers for harvesters generally use belts on rollers to move the harvested crops from lateral areas of the header to a central area for processing. As headers continue to get larger, the belts become longer. Longer belts can be expensive and can be difficult to change when a maintenance problem occurs with the belt. Because headers may need to be taken apart for shipping, adjacently positioned splits belts are generally used to break down the overall belt distance into two or more separate belt and roller assemblies. Such assemblies use rollers of the same diameter, resulting in a gap between the rollers through which crop can be lost during harvesting.

Figure 1:
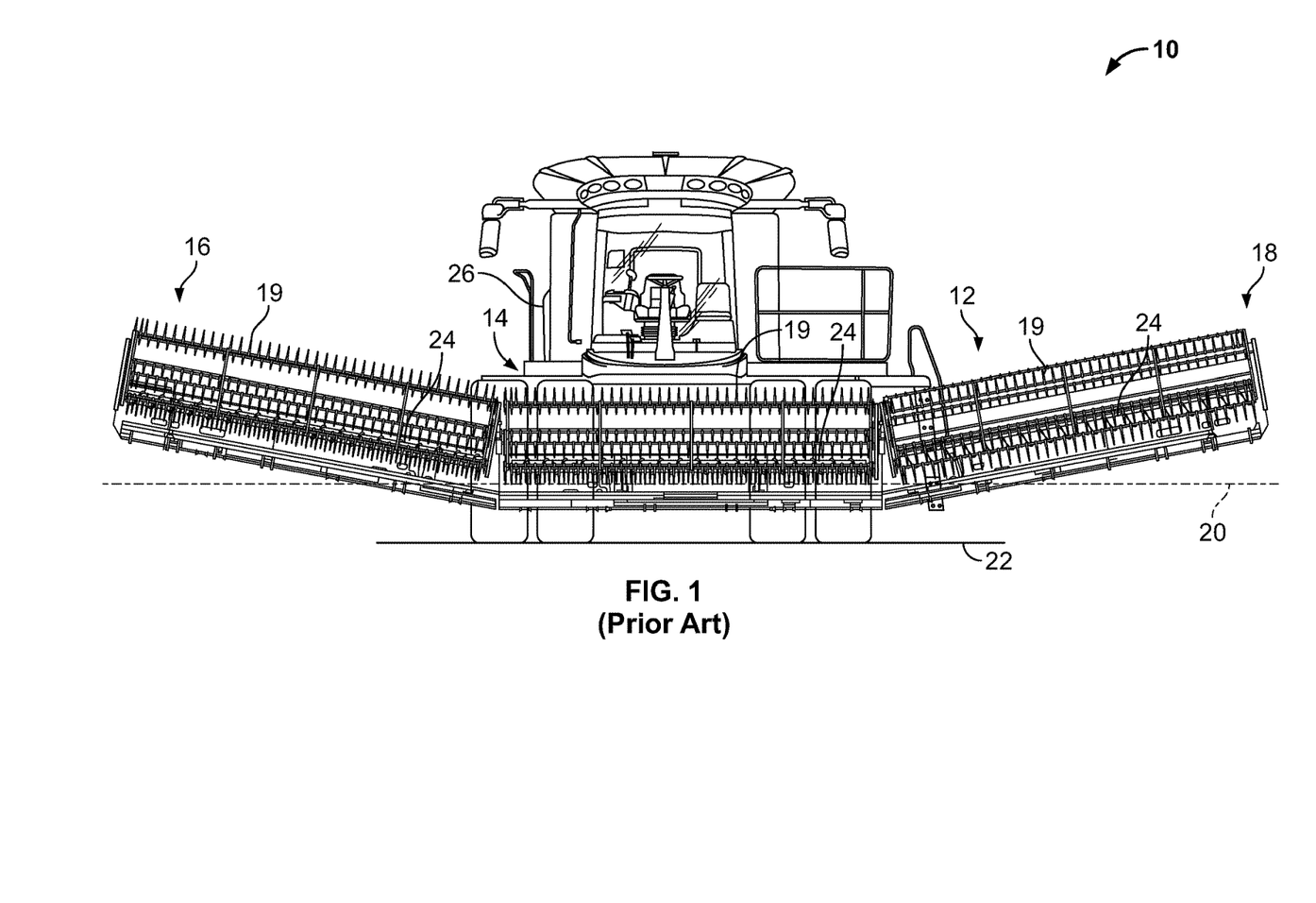
FIG. 1 is a front view of a traditional harvester including a header.

For example, FIG. 1 shows a front view of a traditional harvester 10. The harvester 10 includes a header 12. The header 12 can be in the form of a non-pivoting structure or can include a central section 14 with right and left wings 16, 18 capable of pivoting relative to the central section 14 to accommodate uneven terrain. A lateral plane 20 extends through the header 12 and can generally be substantially perpendicular to the ground 22 during normal use. The header 12 includes one or more augers 24 disposed behind the central section 14 and the right and left wings 16, 18 to assist in guiding crop from the header 12 into a processing system 26 within the harvester 10. The central section 14 and the right and left wings 16, 18 include reels 19.

Figure 2:
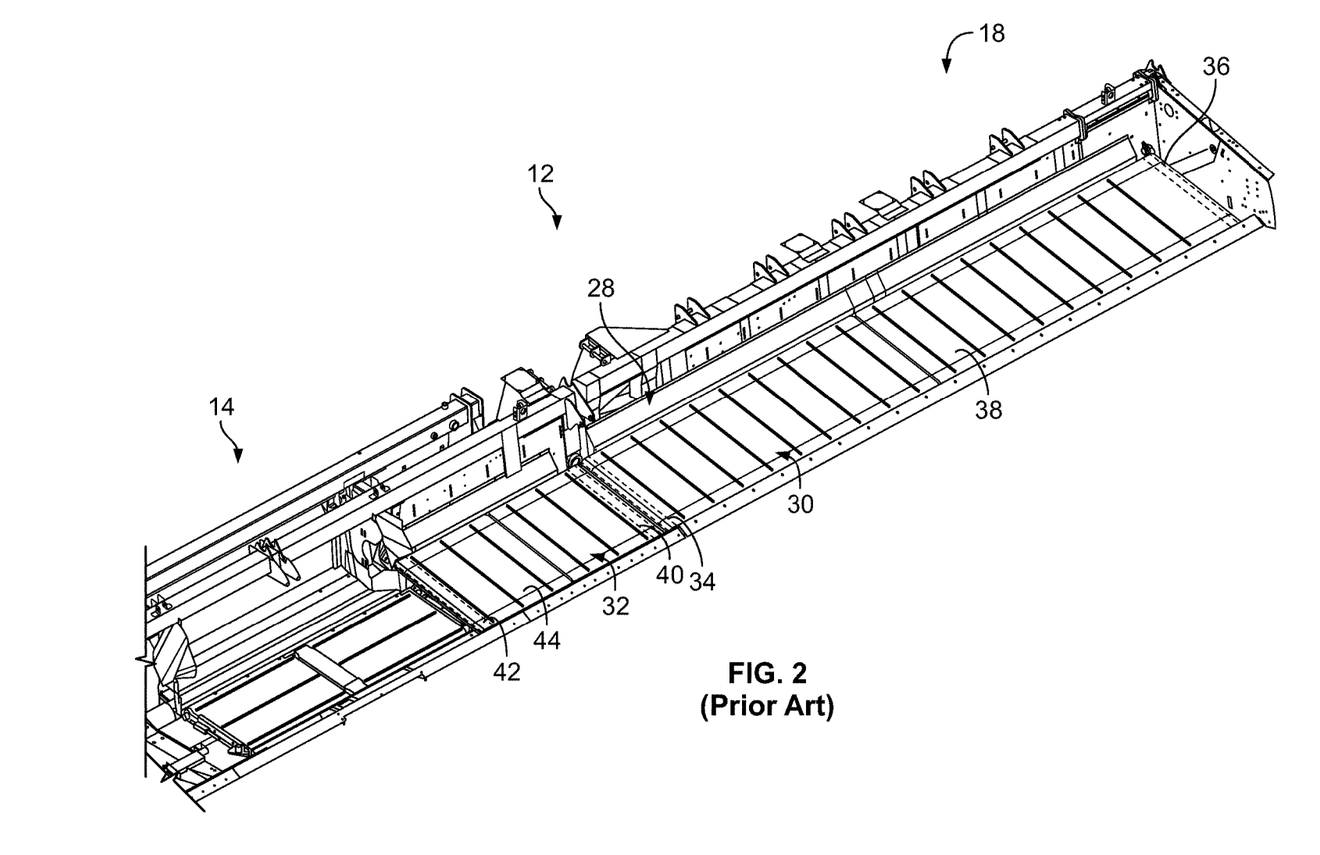
FIG. 2 is a perspective, partial view of a traditional harvester header.
Figure 3:
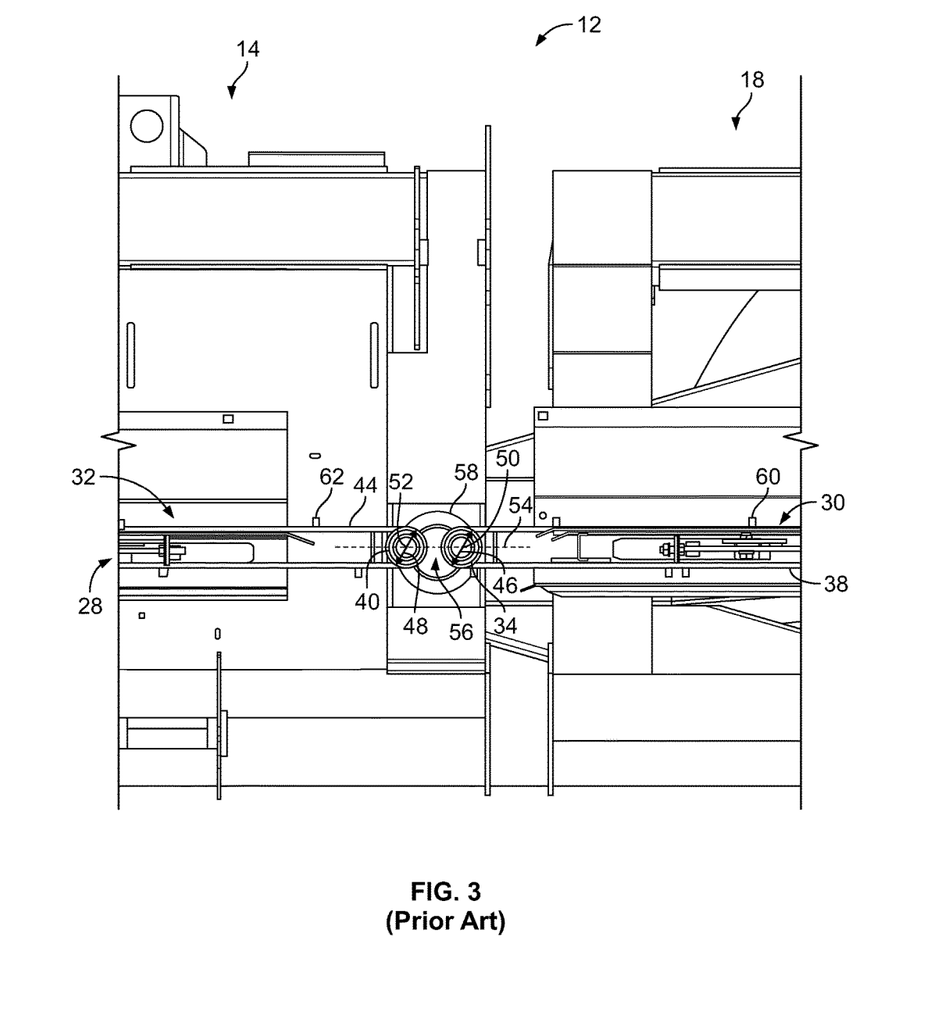
FIG. 3 is a detailed front view of a traditional harvester header.

FIGS. 2 and 3 show perspective and detailed views of the central section 14 and the left wing 18 of the header 12. Although discussed with respect to the left wing 18, it should be understood that the right wing 16 has a similar structure and function. The header 12 includes a draper belt system 28 for transferring harvested crop from the left wing 18 to the central section 14 such that the central section 14 can introduce the crop into the processing system 26. The draper belt system 28 includes a first draper belt assembly 30 at the left wing 18 and a second draper belt assembly 32 at the central section 14 disposed adjacent to the first draper belt assembly 30.

The first draper belt assembly 30 includes a first roller 34, a second roller 36, and a belt 38 looped around the first and second rollers 34, 36. The second draper belt assembly 32 includes a third roller 40, a fourth roller 42, and a belt 44 looped around the third and fourth rollers 40, 42. As the belt 38 is rotated in a counterclockwise direction, crop collected on the belt 38 is transferred from the left wing 18 to the belt 44 of the central section 14.

As shown in the detailed view of FIG. 3, the first roller 34 defines a diameter 46 dimensioned the same as a diameter 48 of the third roller 40. The first roller 34 spins about a central longitudinal axis 50 and the second roller 40 spins about a central longitudinal axis 52, both of which are aligned relative to each other along the same lateral plane 54. The first and third rollers 34, 40 are spaced from each other to form a gap 56 in order to provide clearance for pivoting the left wing 18 relative to the central section 14 at a hinge 58. The first and third rollers 34, 40 are also spaced from each other to provide clearance for cleats 60, 62 extending from the outer surfaces of the belts 38, 44 that assist in gripping and transferring the harvested crop along the belts 38, 44.

Due to the same diameters 46, 48 of the rollers 34, 40 and the alignment along the lateral plane 54, the size of the gap 56 results in loss of a portion of the harvested crop through the gap 56 during transfer of the crop from the left wing 18 to the central section 14. A similar loss in crop occurs during transfer of the crop from the right wing 16 to the central section 14. Therefore, a significant amount of crop that can be lost over time due to the large gaps 56 between the belts 38, 44.

SUMMARY

Exemplary embodiments are directed to a draper belt system for a harvester header including first and second draper belt assemblies, the second draper belt assembly having a roller with a diameter sized smaller than the rollers of the first draper belt assembly. The planes passing through the central longitudinal axes of the differently sized rollers are offset such that the smaller sized roller is tucked under the centerline of the larger roller. This configuration advantageously minimizes the gap between the first and second draper belt assemblies, significantly reducing the potential for lost crop.

In accordance with embodiments of the present disclosure, an exemplary draper belt system is provided. The draper belt system includes a first draper belt assembly and a second draper belt assembly. It should be understood that the draper belt system can include more than two draper belt assemblies. The first draper belt assembly includes a first roller, a second roller, and one or a plurality of draper belts looped around the first and second rollers. The first roller defines a first roller diameter, a first central longitudinal axis about which the first roller spins, and a first plane extending through the first central longitudinal axis and parallel or substantially parallel to horizontal.

The second draper belt assembly includes a third roller, a fourth roller, and one or a plurality of draper belts looped around the third and fourth rollers. The third roller defines a third roller diameter dimensioned smaller than the first roller diameter, a second central longitudinal axis about which the third roller spins, and a second plane extending through the second central longitudinal axis and parallel or substantially parallel to horizontal. The third roller of the second draper belt assembly is disposed adjacent to or substantially adjacent to the first roller of the first draper belt assembly with the first central longitudinal axis extending parallel or substantially parallel to the second central longitudinal axis, and the second plane offset from the first plane.

The third roller of the second draper belt assembly can be disposed adjacent or substantially adjacent to the first roller of the first draper belt assembly with the second plane of the third roller disposed below the first plane of the first roller. The first draper belt assembly can be pivotally disposed relative to the second draper belt assembly. The first draper belt assembly can pivot relative to the second draper belt assembly at a central longitudinal pivot axis disposed between the first and second draper belt assemblies.

The draper belt system can include a wing frame coupled to a distal end of the first draper belt assembly. The distal end defines the side of the draper belt system disposed adjacent to the harvester when a header including the draper belt system is mounted to the harvester (e.g., the opposing end from the leading edge or proximal end of the draper belt system). The draper belt system can include a central frame coupled to a distal end of the second draper belt assembly. The draper belt system can include a hinge coupling the wing frame with the central frame, the first draper belt assembly pivoting relative to the second draper belt assembly at the hinge. The draper belt system can include a first Z-channel coupled to a proximal end of the first draper belt assembly, and a second Z-channel coupled to a proximal end of the second draper belt assembly.

In accordance with embodiments of the present disclosure, an exemplary harvester header is provided. The harvester includes a first draper belt assembly, a second draper belt assembly, and a central draper belt assembly. The first draper belt assembly includes a first roller, a second roller, and one or a plurality of belts looped around the first and second rollers. The first roller defines a first roller diameter, a first central longitudinal axis about which the first roller spins, and a first plane extending through the first central longitudinal axis and parallel or substantially parallel to horizontal. The second draper belt assembly includes a third roller, a fourth roller, and one or a plurality of draper belts looped around the third and fourth rollers. The third roller defines a third roller diameter dimensioned smaller than the first roller diameter, a second central longitudinal axis about which the third roller spins, and a second plane extending through the second central longitudinal axis and parallel or substantially parallel to horizontal.

The central draper belt assembly includes a fifth roller, a sixth roller, and one or a plurality of belts looped around the fifth and sixth rollers. The third roller of the second draper belt assembly is disposed adjacent to the first roller of the first draper belt assembly with the first central longitudinal axis extending parallel or substantially parallel to the second central longitudinal axis, and the second plane offset from the first plane. The first draper belt assembly spins the one or plurality of belts on the first draper belt assembly in a first direction, the second draper belt assembly spins the second draper belt in the first direction, and the central draper belt assembly spins the one or plurality of belts in a second direction different from the first direction.

In one embodiment, the second direction can be substantially perpendicular to the first direction. In one embodiment, the second direction can be at an angle relative to the first direction. In one embodiment, the angle can be between about 400 and about 850. The central draper belt assembly can define an infeed draper. The harvester header can include a wing frame coupled to a distal end of the first draper belt assembly, and a central frame coupled to a distal end of the second draper belt assembly and the central draper belt assembly. The harvester header can include a hinge coupling the wing frame with the central frame, the first draper belt assembly pivoting relative to the second draper belt assembly at the hinge.

In accordance with embodiments of the present disclosure, an exemplary harvester is provided. The harvester includes a header and a processing system. The header includes a first draper belt assembly, a second draper belt assembly, a central draper belt assembly, and an auger. The first draper belt assembly includes a first roller, a second roller, and one or a plurality of belts looped around the first and second rollers. The first roller defines a first roller diameter, a first central longitudinal axis about which the first roller spins, and a first plane extending through the first central longitudinal axis and parallel or substantially parallel to horizontal. The second draper belt assembly includes a third roller, a fourth roller, and one or a plurality of belts looped around the third and fourth rollers. The third roller defines a third roller diameter dimensioned smaller than the first roller diameter, a second central longitudinal axis about which the third roller spins, and a second plane extending through the second central longitudinal axis and parallel or substantially parallel to horizontal.

The central draper belt assembly includes a fifth roller, a sixth roller, and one or a plurality of belts looped around the fifth and sixth rollers. The auger is disposed adjacent or substantially adjacent to the first draper belt assembly, the second draper belt assembly, and the central draper belt assembly (e.g., behind at least a portion of the first, second and central draper belt assemblies). The auger defines a third central longitudinal axis about which the auger spins.

The third roller of the second draper belt assembly is disposed adjacent to the first roller of the first draper belt assembly with the first central longitudinal axis extending parallel or substantially parallel to the second central longitudinal axis, and the second plane offset from the first plane. The first draper belt assembly spins the one or plurality of belts of the first draper belt assembly in a first direction, the second draper belt assembly spins the one or plurality of belts of the second draper belt assembly in the first direction, and the central draper belt assembly spins the one or plurality of belts in a second direction different from the first direction. The processing system is configured to process crop introduced into the processing system through the central draper belt assembly.

In one embodiment, the third central longitudinal axis can be oriented substantially perpendicularly to the first and second central longitudinal axes. In one embodiment, the second direction can be substantially perpendicular to the first direction. In one embodiment, the second direction can be at an angle relative to the first direction. In one embodiment, the angle can be between about 40° and about 85°. The harvester can include a wing frame coupled to a distal end of the first draper belt assembly, and a central frame coupled to a distal end of the second draper belt assembly and the central draper belt assembly. The harvester can include a hinge coupling the wing frame with the central frame, the first draper belt assembly pivoting relative to the second draper belt assembly at the hinge.

In accordance with embodiments of the present disclosure, an exemplary method of operating a harvester header is provided. The method includes spinning a first roller of a first draper belt assembly about a first central longitudinal axis. The first draper belt assembly includes the first roller, a second roller, and one or a plurality of belts looped around the first and second rollers. The first roller defines a first roller diameter, and a first plane extending through the first central longitudinal axis and parallel or substantially parallel to horizontal. The method includes spinning a third roller of a second draper belt assembly about a second central longitudinal axis. The second draper belt assembly includes the third roller, a fourth roller, and one or a plurality of draper belts looped around the third and fourth rollers The third roller defines a third roller diameter dimensioned smaller than the first roller diameter, and a second plane extending through the second central longitudinal axis and parallel or substantially parallel to horizontal.

The method includes spinning fifth and sixth rollers of a central draper belt assembly to move one or a plurality of belts looped around the fifth and sixth rollers. The third roller of the second draper belt assembly is disposed adjacent to the first roller of the first draper belt assembly with the first central longitudinal axis extending parallel or substantially parallel to the second central longitudinal axis, and the second plane offset from the first plane. The first draper belt assembly spins the one or plurality of belts on the first draper belt assembly in a first direction, the second draper belt assembly spins the second draper belt in the first direction, and the central draper belt assembly spins the one or plurality of belts in a second direction different from the first direction.

In one embodiment, the second direction can be substantially perpendicular to the first direction. In one embodiment, the second direction can be at an angle relative to the first direction. In one embodiment, the angle can be between about 40° and about 85°. The central draper belt assembly can define an infeed draper. The harvester header can include a wing frame coupled to a distal end of the first draper belt assembly, and a central frame coupled to a distal end of the second draper belt assembly and the central draper belt assembly. The harvester header can include a hinge coupling the wing frame with the central frame. The method can include pivoting the first draper belt assembly relative to the second draper belt assembly at the hinge.

In accordance with embodiments of the present disclosure, an exemplary method of operating a harvester is provided. The method includes spinning a first roller of a first draper belt assembly of a header about a first central longitudinal axis. The first draper belt assembly includes the first roller, a second roller, and one or a plurality of belts looped around the first and second rollers. The first roller defines a first roller diameter, and a first plane extending through the first central longitudinal axis and parallel or substantially parallel to horizontal. The method includes spinning a third roller of a second draper belt assembly of a header about a second central longitudinal axis. The second draper belt assembly includes the third roller, a fourth roller, and one or a plurality of draper belts looped around the third and fourth rollers. The third roller defines a third roller diameter dimensioned smaller than the first roller diameter, and a second plane extending through the second central longitudinal axis and parallel or substantially parallel to horizontal.

The method includes spinning fifth and sixth rollers of a central draper belt assembly of a header to move one or a plurality of belts looped around the fifth and sixth rollers. The method includes spinning an auger about a third central longitudinal axis. The auger is disposed adjacent or substantially adjacent to the first draper belt assembly, the second draper belt assembly, and the central draper belt assembly. The method includes introducing crop into a processing system through the central draper belt assembly for processing the crop.

The third roller of the second draper belt assembly is disposed adjacent to the first roller of the first draper belt assembly with the first central longitudinal axis extending parallel or substantially parallel to the second central longitudinal axis, and the second plane offset from the first plane. The first draper belt assembly spins the one or plurality of belts of the first draper belt assembly in a first direction, the second draper belt assembly spins the one or plurality of belts of the second draper belt assembly in the first direction, and the central draper belt assembly spins the one or plurality of belts in a second direction different from the first direction.

In one embodiment, the second direction can be substantially perpendicular to the first direction. In one embodiment, the second direction can be at an angle relative to the first direction. In one embodiment, the angle can be between about 40° and about 85°. The central draper belt assembly can define an infeed draper. The header can include a wing frame coupled to a distal end of the first draper belt assembly, and a central frame coupled to a distal end of the second draper belt assembly and the central draper belt assembly. The header can include a hinge coupling the wing frame with the central frame. The method can include pivoting the first draper belt assembly relative to the second draper belt assembly at the hinge.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed draper belt systems, reference is made to the accompanying figures, wherein.

DETAILED DESCRIPTION

It should be understood that the relative terminology used herein, such as "front", "rear", "left", "top", "bottom", "vertical", "horizontal", "up" and "down" is solely for the purposes of clarity and designation and is not intended to limit embodiments to a particular position and/or orientation. Accordingly, such relative terminology should not be construed to limit the scope of the present disclosure. In addition, it should be understood that the scope of the present disclosure is not limited to embodiments having specific dimensions. Thus, any dimensions provided herein are merely for an exemplary purpose and are not intended to limit the invention to embodiments having particular dimensions.

The term "belt" as used herein refers to a belt, chain, or other mode of conveying material. The term "horizontal" as used herein refers to a lateral plane of the harvester or harvester header oriented substantially parallel to the terrain on which the harvester travels during normal operation and/or orientation of the harvester.

Figure 4:
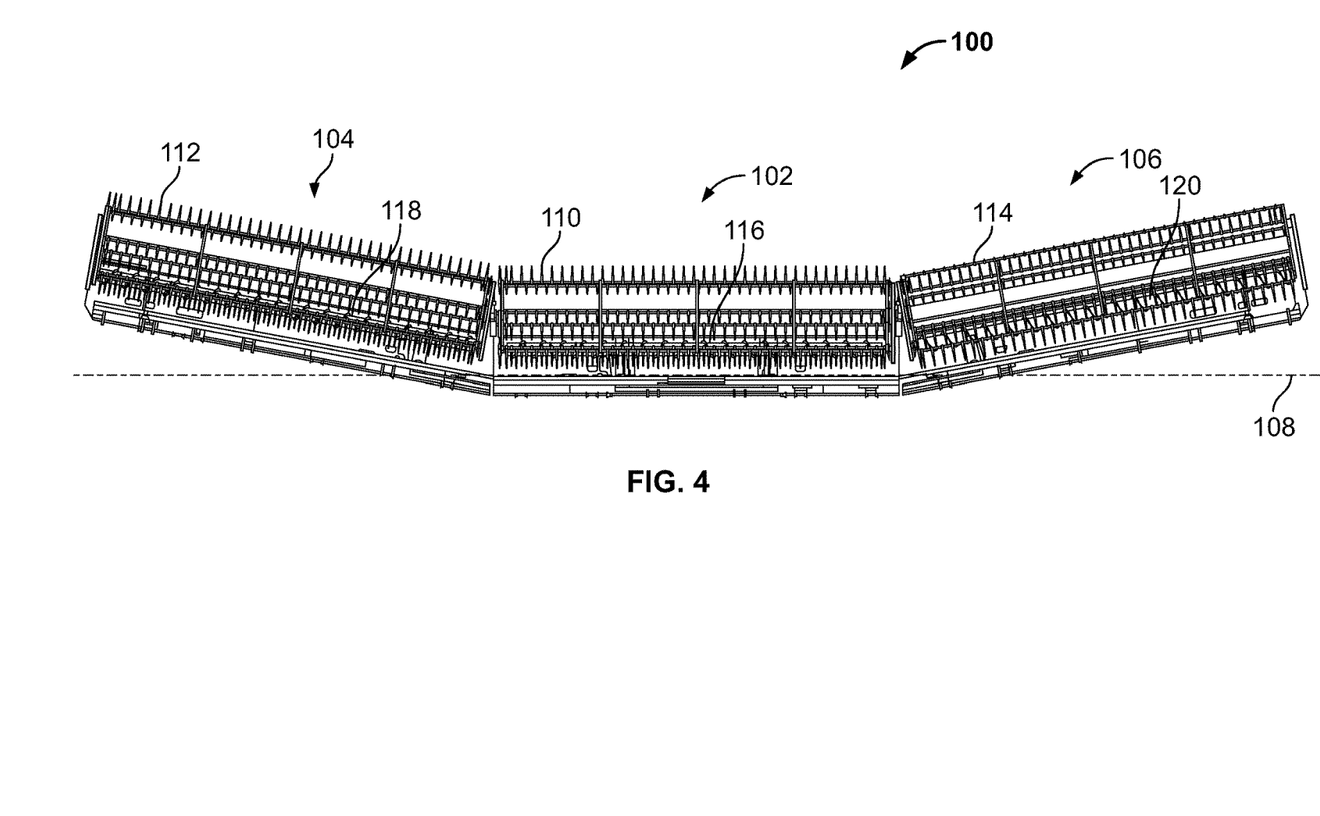
FIG. 4 is a front view of an exemplary harvester header of the present disclosure including a right wing, a left wing, and a central section.

FIG. 4 shows a front view of an exemplary harvester header 100 including a central section 102, a right wing 104, and left wing 106. The harvester header 100 can be used with any type of harvester, such as for example, harvester 10 of FIG. 1. A lateral plane 108 extends through the harvester header 100 and can be substantially perpendicular to the ground during normal use. The right and left wings 104, 106 can be independently flexed or pivoted at respective hinges relative to the central section 102 to accommodate uneven terrain. In one embodiment, the harvester header 100 can include one or more sensors configured to detect changes in the terrain (e.g., valleys, hills, or the like), the detected changes can be electronically transmitted to a central controller, and the central controller can adjust the pivoting position of the right and/or left wings 104, 106 relative to the central section 102 to correspond with the changing terrain.

The harvester header 100 can include a central reel 110, a right wing reel 112, and left wing reel 114. The harvester header 100 includes a central auger 116 disposed at or near the distal end of the central section 102 (e.g., an opposing end from the leading edge of the harvester header 100). The harvester header 100 includes individual lateral augers 118, 120 disposed at or near the distal end of the respective right and left wings 104, 106. The central auger 116 rotates about a longitudinal axis extending substantially parallel to the lateral plane 108. The lateral augers 118, 120 rotate about a longitudinal axis extending substantially parallel to the lateral plane 108 when the right and left wings 104, 106 are in the unflexed or non-pivoted position (e.g., substantially aligned along the lateral plane 108 with the central section 102). The augers 116, 118, 120 are configured to rotatably introduce harvested crop from the central section 102 and the right and left wings 104, 106 into a processing system of a harvester.

Figure 5:
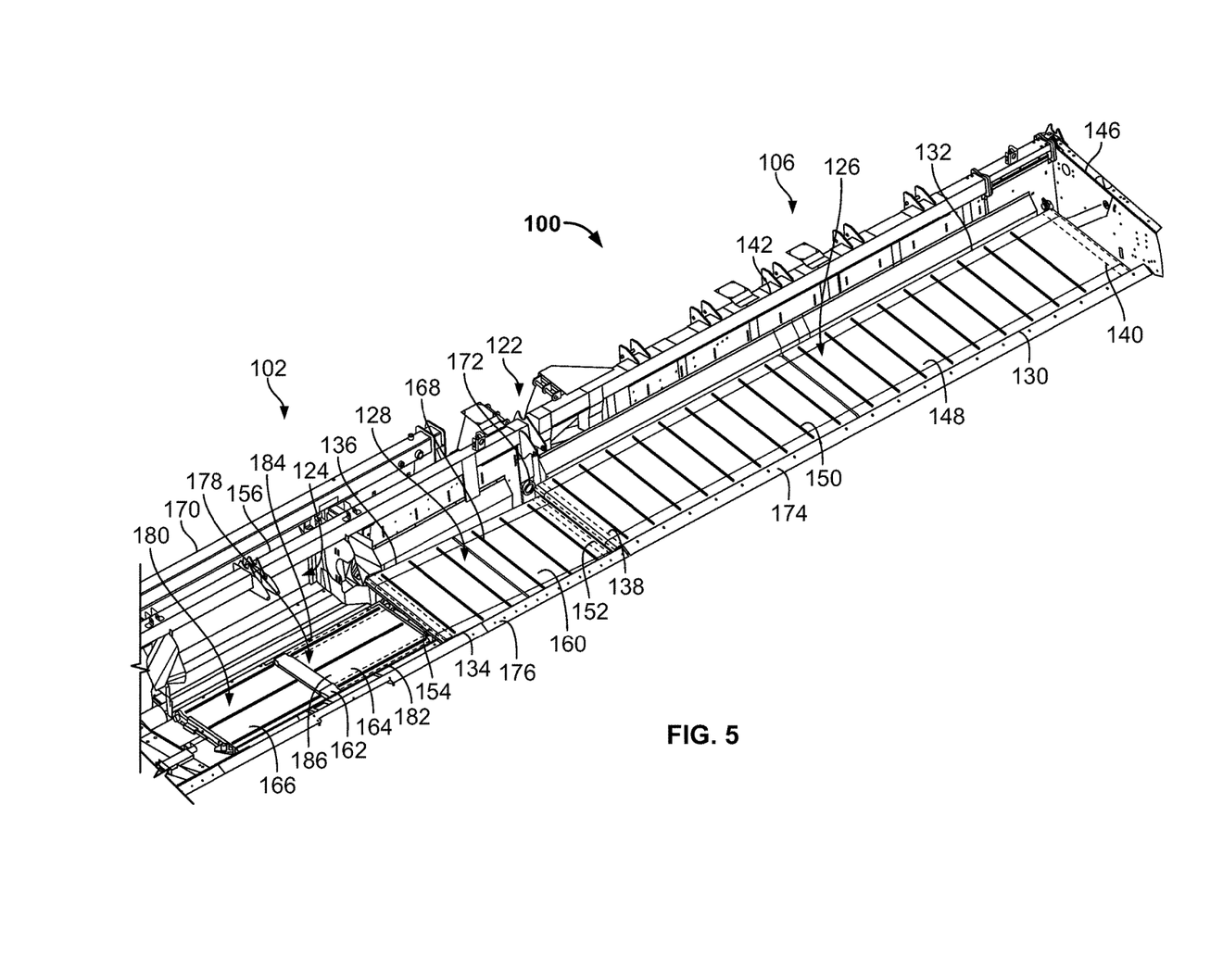
FIG. 5 is a perspective, partial view of an exemplary harvester header of the present disclosure including a draper belt system with differently sized roller diameters.
Figure 6:
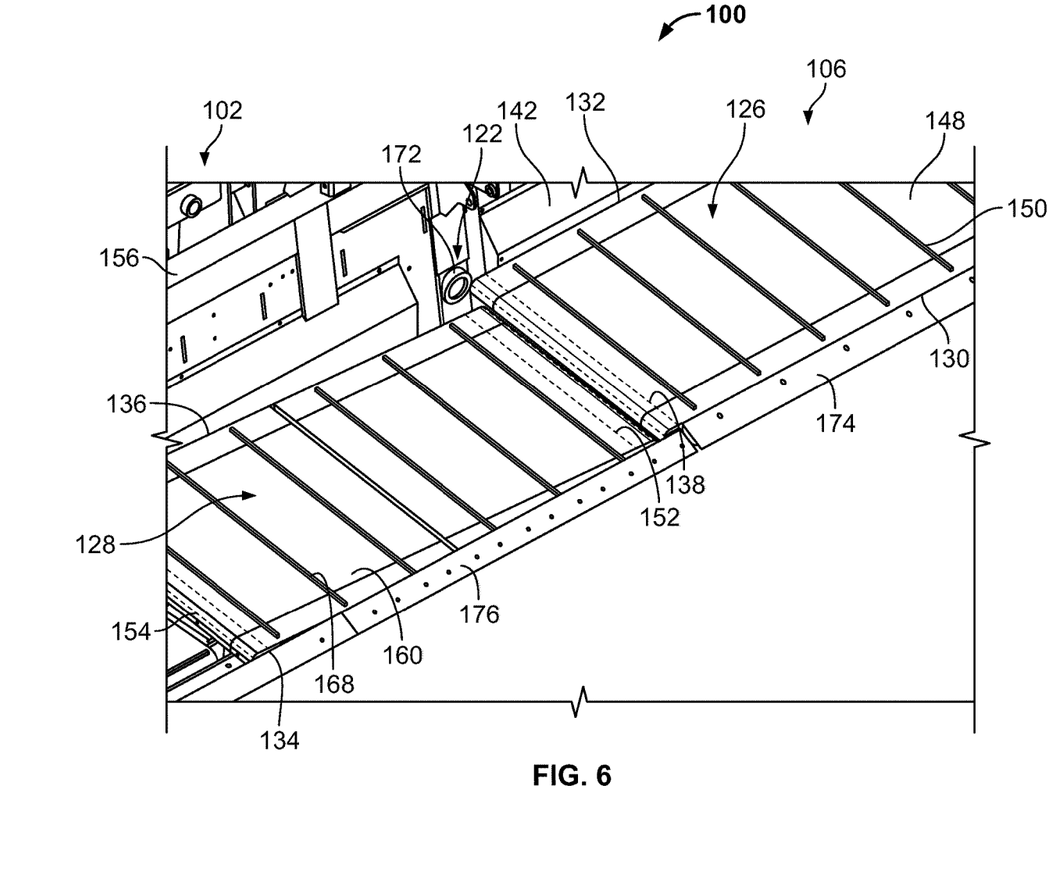
FIG. 6 is a detailed, partial perspective view of an exemplary harvester header of the present disclosure including a draper belt system with differently sized roller diameters.
Figure 7:
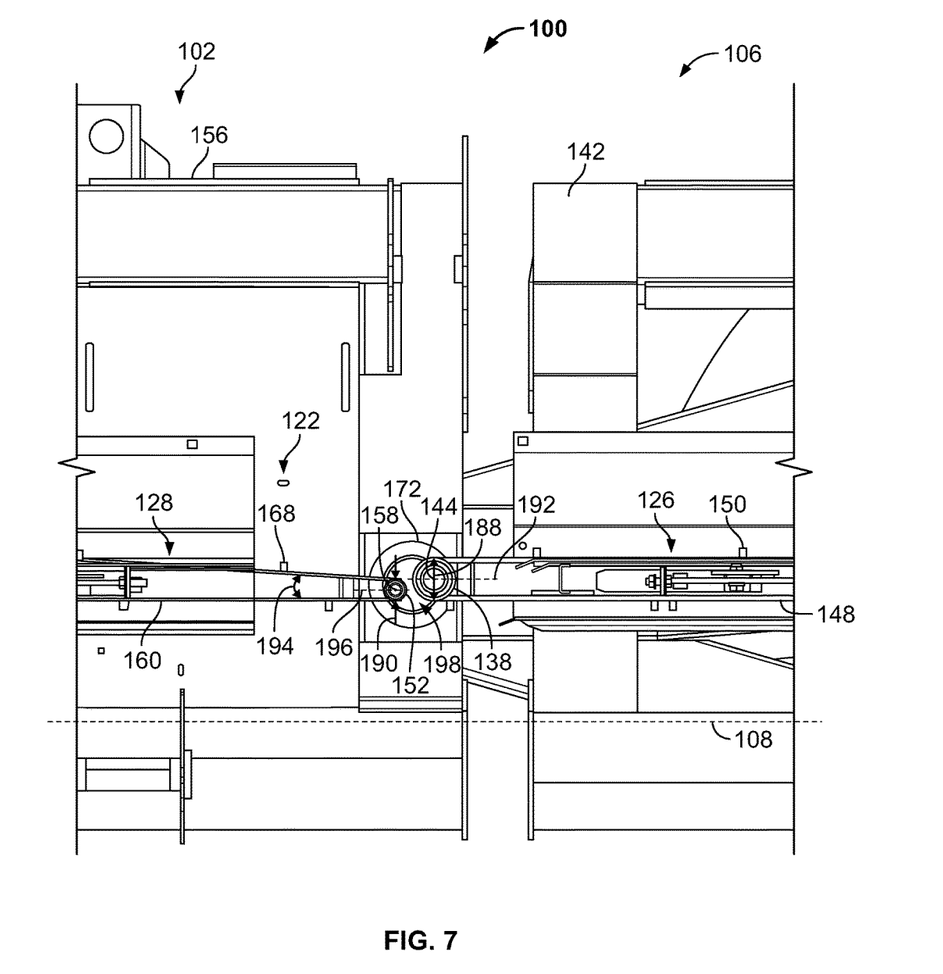
FIG. 7 is a detailed, partial front view of an exemplary harvester header of the present disclosure including a draper belt system with differently sized roller diameters.

FIGS. 5-7 show perspective, detailed and front views of the harvester header 100. In particular, FIG. 5 shows a perspective view of the central section 102 and left wing 106 of the harvester header 100, FIG. 6 shows a perspective detailed view of the central section 102 and the left wing 106 of the harvester header 100, and FIG. 7 is a detailed front view of the central section 102 and the left wing 106 of the harvester header 100. Although FIGS. 5-7 show only the central section 102 and the left wing 106, it should be understood that the connection between the central section 102 and the right wing 104 can be substantially similar in structure and function. In addition, certain components of the harvester header 100 have been removed for clarity and therefore FIGS. 5-7 provide only a partial assembly of the harvester header 100.

The harvester header 100 includes a draper belt system 122 for transferring harvested crop from the left wing 106 to the central section 102 and into an infeed section 124. The draper belt system 122 includes a first draper belt assembly 126 at the left wing 106 and a second draper belt assembly 128 at the central section 102. The first draper belt assembly 126 includes a proximal end 130 at the leading edge and an opposing distal end 132. The second draper belt assembly 128 similarly includes a proximal end 134 and a distal end 136.

The first draper belt assembly 126 includes a first roller 138 and a second roller 140 rotatably mounted to a wing frame 142. The first and second rollers 138, 140 can be substantially parallel to each other and rotate along central longitudinal axes extending the length of the respective rollers 138, 140. For example, FIG. 7 shows the central longitudinal axis 144 (e.g., a first central longitudinal axis) of the first roller 138. The left wing 106 can include a side panel 146 coupled to the wing frame 142 at an end opposing the central section 102 to prevent loss of harvested crop.

The first draper belt assembly 126 includes one or a plurality of draper belts 148 looped around the first and second rollers 138, 140. The rollers 138, 140 can be actuated to rotate in a counterclockwise direction to rotate the draper belt 148 in the direction of the central section 102 such that crop positioned on the draper belt 148 can be transported and transferred to the central section 102. In some embodiments, the draper belt 148 can include one or more cleats 150 extending from an outer surface of the draper belt 148 to reduce sliding of the crop on the draper belt 148.

The second draper belt assembly 128 includes a third roller 152 and a fourth roller 154 rotatably mounted to a central frame 156. The third and fourth rollers 152, 154 can be substantially parallel to each other and rotate along central longitudinal axes extending the length of the respective rollers 152, 154. For example, FIG. 7 shows the central longitudinal axis 158 of the third roller 152 (e.g., a second central longitudinal axis). The central longitudinal axes of the third and fourth rollers 152, 154 can be substantially parallel to the central longitudinal axes of the first and second rollers 138, 140.

The second draper belt assembly 128 includes one or a plurality of draper belts 160 looped around the third and fourth rollers 152, 154. The rollers 152, 154 can be actuated to rotate in a counterclockwise direction to rotate the draper belt 160 in the direction of a central point 162 of the central section 102 such that crop positioned on the draper belt 148 can be transferred to the draper belt 160, and further transported to one or more infeed drapers 164, 166. For example, the infeed draper 164 can receive crop from the left wing 106 through the draper belt system 122, and the infeed draper 166 can receive crop from the right wing 104 through a draper belt system substantially similar to the draper belt system 122.

Each infeed draper 164, 166 forms a central draper belt assembly 178, 180 that transfers the crop into the infeed section 124 for further processing. The central draper belt assembly 178 includes a fifth roller 182, sixth roller 184, and one or a plurality of draper belts 186 looped around the fifth and sixth rollers 182, 184. The draper belts 126, 160 can be rotated in a first direction (e.g., both in a counterclockwise direction). The draper belt 186 can be rotated in a second direction that is different from the first direction. In one embodiment, the draper belt 186 can spin in a substantially perpendicular direction relative to the draper belts 126, 160. In one embodiment, the draper belt 186 can spin at an angle (e.g., between about 40° and about 85°) relative to the draper belts 126, 160.

In some embodiments, the draper belt 160 can include one or more cleats 168 extending from an outer surface of the draper belt 160 to reduce sliding of the crop on the draper belt 160. The central section 102 can include an adaptor bar 170 configured and dimensioned to be detachably coupled to a complementary receiving section of a harvester or combine. A z-channel 174 can be coupled to the wing frame 142 at or near the proximal end of the first draper belt assembly 126. A z-channel 176 can be coupled to the central frame 156 at or near the proximal end of the second draper belt assembly 128.

One or more hinges 172 mechanically couple the wing frame 142 with the central frame 156 such that the left wing 106 can be selectively flexed or pivoted upward or downward relative to the lateral plane 108. As an example, FIG. 4 shows both the right and left wings 104, 106 flexed or pivoted upward relative to the lateral plane 108. The first and second draper belt assemblies 126, 128 can therefore be pivoted relative to each other by pivoting the frames 142, 156 at the hinge 172. The hinge 172 includes a central longitudinal pivot axis extending substantially parallel to the central longitudinal axes of the rollers 138, 152.

As shown in the detailed view of FIG. 7, the first roller 138 defines a diameter 188 and the third roller 152 defines a diameter 190. The first roller diameter 188 can be dimensioned substantially similarly to the diameter of the second roller 140 such that the top and bottom surfaces of the draper belt 148 extend substantially parallel relative to each other. In particular, the top and bottom surfaces of the draper belt 148 can be substantially parallel to the lateral plane 108 when the left wing 106 is in the non-pivoted configuration (e.g., a flat configuration). A plane 192 extends through the central longitudinal axis 144 and substantially parallel to horizontal (e.g., parallel to the lateral plane 108 when the left wing 106 is in the non-pivoted configuration of FIG. 7).

The third roller diameter 190 is dimensioned smaller than the first roller diameter 188. In one embodiment, the third roller diameter 190 can be dimensioned smaller than the diameter of the fourth roller 154 such that the top and bottom surfaces of the draper belt 160 extend at an angle 194. The angle 194 between the top and bottom surfaces results in the draper belt 160 tapering from the fourth roller 152 in the direction of the third roller 152. In one embodiment, the diameter of the fourth roller 152 can be dimensioned equal to the third roller diameter 190 (e.g., both diameters dimensioned smaller than the first roller diameter 188) such that the top and bottom surfaces of the draper belt 160 extending substantially parallel to each other and the lateral plane 108. A plane 196 extends through the central longitudinal axis 158 and substantially parallel to horizontal (e.g., parallel to the lateral plane 108 and the plane 192 when the left wing 106 is in the non-pivoted configuration of FIG. 7).

The first roller 138 of the first draper belt assembly 126 and the third roller 152 of the second draper belt assembly 128 are positioned adjacent to each other to allow for crop to be transferred from the draper belt 148 to the draper belt 160. The first and second draper belt assemblies 126, 128 form a split lateral belt assembly with differently sized rollers at the split. In order to allow for clearance between the draper belts 148, 160 and the cleats 150, 168, a gap 198 is formed between the first and second draper belt assemblies 126, 128. The central longitudinal axes 144, 158 extend substantially parallel relative to each other. Due to the smaller diameter 158 of the third roller 152, the third roller 152 is positioned offset from the first roller 138 (e.g., from the centerline of the first roller 138) to reduce the size of the gap 198.

In particular, the third roller 152 can be "tucked" under the first roller 138 such that the third roller plane 196 is disposed below the first roller plane 192. The offset position of the first and third roller planes 192, 196 and the smaller third roller diameter 190 allows the third roller 152 to be positioned closer to the first roller 138, thereby reducing the size of the gap 198 between the first and second draper belt assemblies 126, 128. In contrast to the first and third rollers 34, 40 which are aligned along the same plane 54, the first and third rollers 138, 152 are offset both vertically and laterally relative to each other while maintaining the planes 192, 196 substantially parallel. The smaller sized gap 198 reduces the amount of crop lost through the gap 198. In addition, due to the offset or higher position of the first roller 138 relative to the third roller 152, crop moving and dropping off the draper belt 148 is urged laterally with a trajectory that generally passes the gap 198 by the time the crop contacts the draper belt 160. The potential for crop dropping through the gap 198 is thereby further reduced during the transition between the first and second draper belt assemblies 126, 128.

Figure 8:
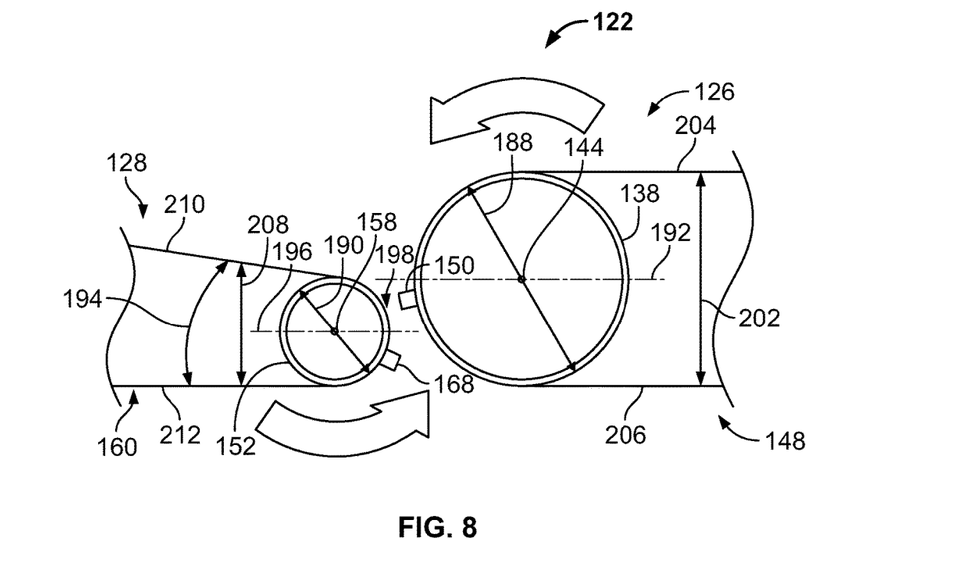
FIG. 8 is a diagrammatic front view of an exemplary draper belt system of the present disclosure including differently sized roller diameters.
Figure 9:
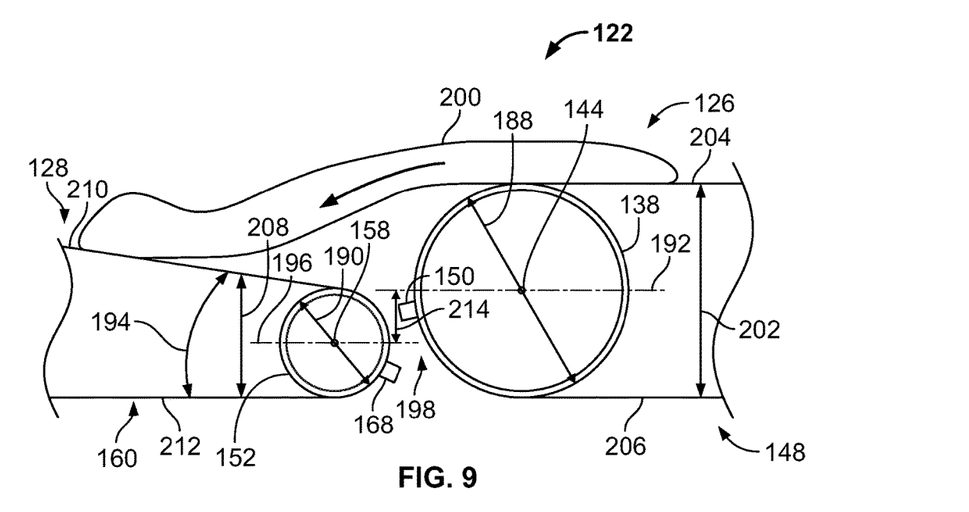
FIG. 9 is a diagrammatic front view of an exemplary draper belt system of the present disclosure including differently sized roller diameters.

FIGS. 8 and 9 show diagrammatic front views of the exemplary draper belt system 122. In particular, FIG. 8 shows a detailed view of the adjacently positioned first and second draper belt assemblies 126, 128, and FIG. 9 shows a detailed view of crop 200 being transferred from the first draper belt assembly 126 to the second draper belt assembly 128. As noted above, due to the same diameter 188 dimension of the first and second rollers 138, 140, the distance 202 between the top surface 204 and the bottom surface 206 of the draper belt 148 is substantially constant along the length of the draper belt 148. In contrast, due to the dissimilar sizes of the diameter 190 of the third roller 152 and the fourth roller 154, the distance 208 between the top surface 210 and the bottom surface 212 of the draper belt 160 increases from the third roller 152 in the direction of the fourth roller 154.

In some embodiments, the diameter of the fourth roller 154 can be dimensioned equal to the diameter 190 of the third roller 152 (e.g., both the third and fourth rollers 152, 154 having a diameter dimensioned smaller than the diameter 188). In such embodiments, the distance 208 can be substantially constant along the length of the draper belt 160. Although the third and fourth rollers 152, 154 can have the same diameter 188 size, the "tucked" position of the third roller 152 still functions to reduce the gap 198 between the first and second draper belt assemblies 126, 128. As noted above, the "tucked" position of the third roller 152 results in an offset position of the planes 192, 196 (e.g., the plane 196 offset downwardly from the plane 192 by a distance 214) such that the third roller 152 can be positioned closed to the first roller 138 to reduce the gap 198.

As indicated by the arrow in FIG. 8, the draper belt 148 of the first draper belt assembly 126 rotates counterclockwise due to rotation of the first and second rollers 138, 140. As also indicated by the arrow in FIG. 8, the draper belt 160 of the second draper belt assembly 128 rotates counterclockwise due to rotation of the third and fourth rollers 152, 154. The speed of rotation of the draper belt 148 urges the crop 200 to move towards the central section 102 when the crop 200 leaves the draper belt 148. The reduced size of the gap 198 and the "tucked" position of the third roller 152 combine to reduce the amount of crop 200 potentially dropping through and being lost through the gap 198. The speed of the crop 200 as the crop 200 moves from the draper belt 148 onto the draper belt 160 provides additional assistance in traversing the gap 198.

Figure 10:
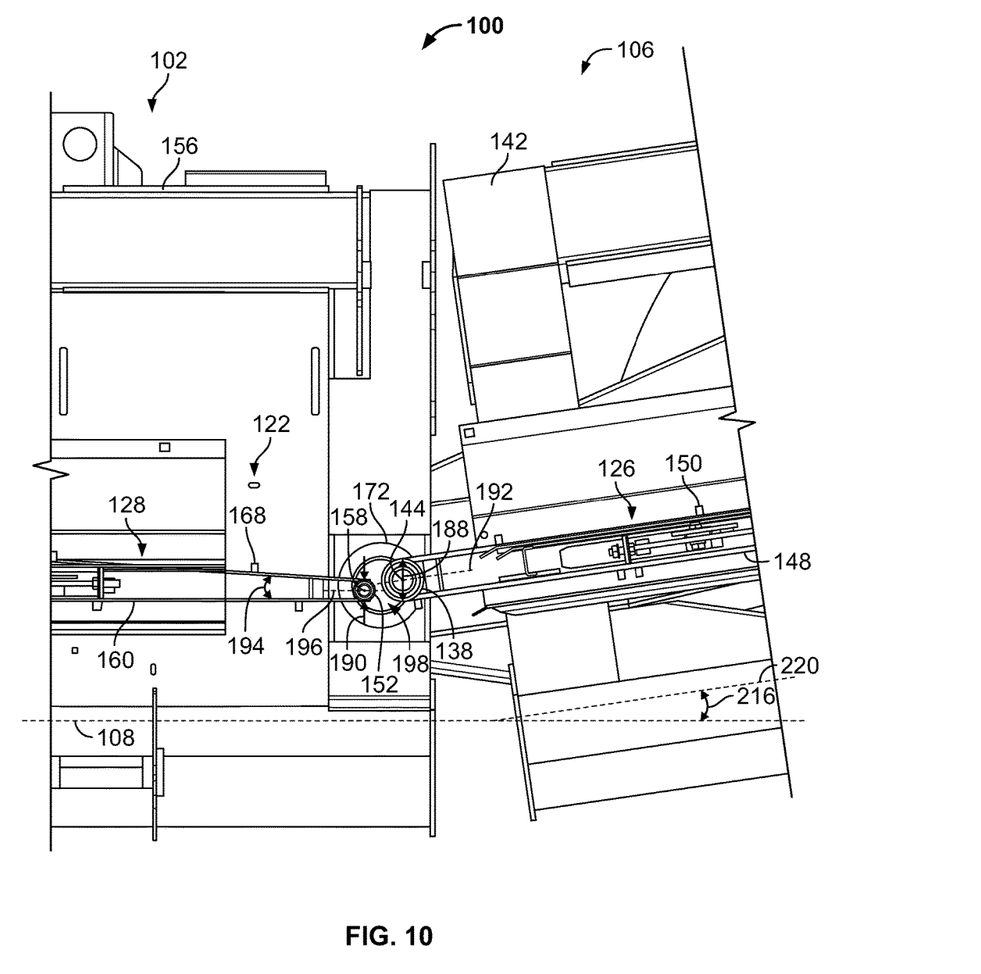
FIG. 10 is a detailed, partial front view of an exemplary harvester header of the present disclosure with a right wing in an upwardly flexed configuration.
Figure 11:
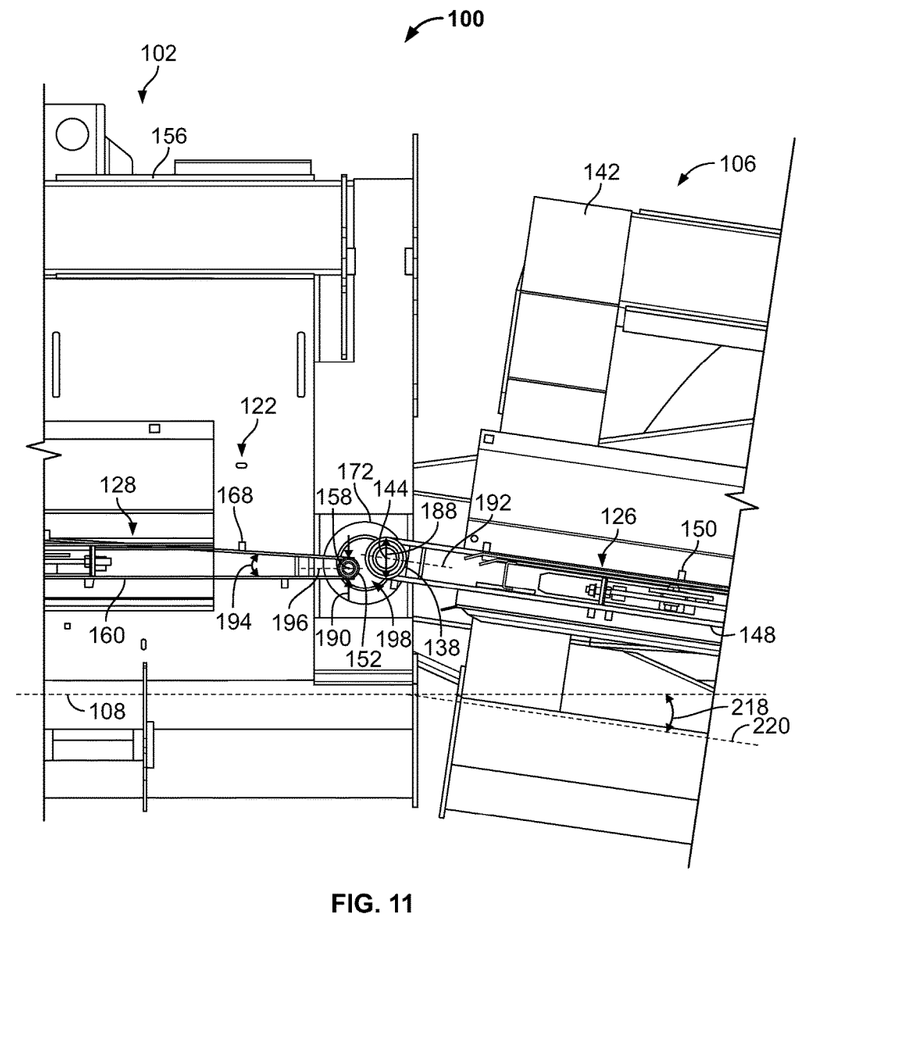
FIG. 11 is a detailed, partial front view of an exemplary harvester header of the present disclosure with a right wing in a downwardly flexed configuration.

FIGS. 10 and 11 show detailed front views of the harvester header 100 in opposing, flexed or pivoted positions. In particular, FIG. 10 shows the left wing 106 flexed or pivoted in an upward direction relative to the lateral plane 108 by an angle 216, and FIG. 11 shows the left wing 106 flexed or pivoted in a downward direction relative to the lateral plane 108 by an angle 218. The angles 216, 218 can be in the range of about 0 degrees (for a flat configuration) to about 45 degrees (as measured between the lateral plane 108 of the central section 102 and the lateral plane 220 of the left wing 106). The right and left wings 104, 106 can therefore be incrementally flexed or pivoted about the hinge 172 to accommodate changes in the terrain during harvesting. The dimensions and positioning of the first and third rollers 138, 152 ensures that the gap 198 between the first and second draper belt assemblies 126, 128 remains minimal even in the flexed or pivoted configuration. Crop can therefore be transferred from the first draper belt assembly 126 to the second draper belt assembly 128 with minimal or no crop loss through the gap 198.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A draper belt system, comprising:
a first draper belt assembly comprising a first roller, a second roller, and one or a plurality of draper belts looped around the first and second rollers, the first roller defining a first roller diameter, a first central longitudinal axis about which the first roller spins, and a first plane extending through the first central longitudinal axis and parallel or substantially parallel to horizontal; and
a second draper belt assembly comprising a third roller, a fourth roller, and one or a plurality of draper belts looped around the third and fourth rollers, the third roller defining a third roller diameter dimensioned smaller than the first roller diameter, a second central longitudinal axis about which the third roller spins, and a second plane extending through the second central longitudinal axis and parallel or substantially parallel to horizontal;
wherein the third roller of the second draper belt assembly is disposed adjacent to or substantially adjacent to the first roller of the first draper belt assembly with the first central longitudinal axis extending parallel or substantially parallel to the second central longitudinal axis, and the second plane offset from the first plane;
wherein the third roller of the second draper belt assembly is disposed adjacent or substantially adjacent to the first roller of the first draper belt assembly with the second plane of the third roller disposed below the first plane of the first roller.

2. The draper belt assembly of claim 1, comprising a wing frame coupled to a distal end of the first draper belt assembly, and comprising a central frame coupled to a distal end of the second draper belt assembly.

3. The draper belt assembly of claim 2, comprising a hinge coupling the wing frame with the central frame, the first draper belt assembly pivoting relative to the second draper belt assembly at the hinge.

4. The draper belt assembly of claim 2, comprising a first Z-channel coupled to a proximal end of the first draper belt assembly, and comprising a second Z-channel coupled to a proximal end of the second draper belt assembly.

5. A harvester header, comprising:
a first draper belt assembly comprising a first roller, a second roller, and one or a plurality of belts looped around the first and second rollers, the first roller defining a first roller diameter, a first central longitudinal axis about which the first roller spins, and a first plane extending through the first central longitudinal axis and parallel or substantially parallel to horizontal;
a second draper belt assembly comprising a third roller, a fourth roller, and one or a plurality of belts looped around the third and fourth rollers, the third roller defining a third roller diameter dimensioned smaller than the first roller diameter, a second central longitudinal axis about which the third roller spins, and a second plane extending through the second central longitudinal axis and parallel or substantially parallel to horizontal; and
a central draper belt assembly comprising a fifth roller, a sixth roller, and one or a plurality of belts looped around the fifth and sixth rollers;
wherein the third roller of the second draper belt assembly is disposed adjacent to the first roller of the first draper belt assembly with the first central longitudinal axis extending parallel or substantially parallel to the second central longitudinal axis, and the second plane offset from the first plane;
wherein the third roller of the second draper belt assembly is disposed adjacent or substantially adjacent to the first roller of the first draper belt assembly with the second plane of the third roller disposed below the first plane of the first roller; and
wherein the first draper belt assembly spins the one or plurality of belts on the first draper belt assembly in a first direction, the second draper belt assembly spins the one or plurality of belts in the first direction, and the central draper belt assembly spins the one or plurality of belts in a second direction different from the first direction.

6. The harvester header of claim 5, wherein the second direction is substantially perpendicular to the first direction.

7. The harvester header of claim 5, wherein the second direction is at an angle relative to the first direction.

8. The harvester header of claim 7, wherein the angle is about 90°.

9. The harvester header of claim 5, wherein the central draper belt assembly defines an infeed draper.

10. The harvester header of claim 5, comprising a wing frame coupled to a distal end of the first draper belt assembly, and comprising a central frame coupled to a distal end of the second draper belt assembly and the central draper belt assembly.

11. The harvester header of claim 10, comprising a hinge coupling the wing frame with the central frame, the first draper belt assembly pivoting relative to the second draper belt assembly at the hinge.

12. A harvester, comprising:
a header comprising:
a first draper belt assembly comprising a first roller, a second roller, and one or a plurality of belts looped around the first and second rollers, the first roller defining a first roller diameter, a first central longitudinal axis about which the first roller spins, and a first plane extending through the first central longitudinal axis and parallel or substantially parallel to horizontal;
a second draper belt assembly comprising a third roller, a fourth roller, and one or a plurality of belts looped around the third and fourth rollers, the third roller defining a third roller diameter dimensioned smaller than the first roller diameter, a second central longitudinal axis about which the third roller spins, and a second plane extending through the second central longitudinal axis and parallel or substantially parallel to horizontal;
a central draper belt assembly comprising a fifth roller, a sixth roller, and one or a plurality of belts looped around the fifth and sixth rollers; and an auger disposed adjacent or substantially adjacent to the first draper belt assembly, the second draper belt assembly, and the central draper belt assembly, the auger defining a third central longitudinal axis about which the auger spins;

wherein the third roller of the second draper belt assembly is disposed adjacent to the first roller of the first draper belt assembly with the first central longitudinal axis extending parallel or substantially parallel to the second central longitudinal axis, and the second plane offset from the first plane;

wherein the third roller of the second draper belt assembly is disposed adjacent or substantially adjacent to the first roller of the first draper belt assembly with the second plane of the third roller disposed below the first plane of the first roller; and wherein the first draper belt assembly spins the one or plurality of belts of the first draper belt assembly in a first direction, the second draper belt assembly spins the one or plurality of belts of the second draper belt assembly in the first direction, and the central draper belt assembly spins the one or plurality of belts in a second direction different from the first direction; and a processing system configured to process crop introduced into the processing system through the central draper belt assembly.

13. The harvester of claim 12, wherein the third central longitudinal axis is oriented substantially perpendicularly to the first and second central longitudinal axes.

14. The harvester of claim 12, wherein the second direction is substantially perpendicular to the first direction.

15. The harvester of claim 12, wherein the second direction is at an angle relative to the first direction.

16. The harvester of claim 15, wherein the angle is about 90°.

17. The harvester of claim 12, comprising a wing frame coupled to a distal end of the first draper belt assembly, a central frame coupled to a distal end of the second draper belt assembly and the central draper belt assembly, and a hinge coupling the wing frame with the central frame, the first draper belt assembly pivoting relative to the second draper belt assembly at the hinge.

* * * * *